United States Patent
Lee et al.

(10) Patent No.: US 7,586,835 B2
(45) Date of Patent: Sep. 8, 2009

(54) APPARATUS FOR GENERATING 2D SPREADING CODE AND METHOD FOR THE SAME

(75) Inventors: Shih-Kai Lee, Taipei Hsien (TW); Po-Lin Chiu, Tai Nan Hsien (TW); Chang-Lung Hsiao, Hsin Chu (TW); Jiann-An Tsai, Ping Tung Hsien (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 832 days.

(21) Appl. No.: 10/995,466

(22) Filed: Nov. 24, 2004

(65) Prior Publication Data

US 2005/0265224 A1    Dec. 1, 2005

(30) Foreign Application Priority Data

May 28, 2004   (TW)   ................ 93115391 A (51) Int. Cl.
   *G04B 5/24*   (2006.01)
(52) U.S. Cl. .................. 370/209; 370/204; 370/335; 375/135; 375/146; 380/260
(58) Field of Classification Search ......... 370/203–210, 370/281; 375/130, 140, 146; 380/268
   See application file for complete search history.

(56) References Cited

U.S. PATENT DOCUMENTS

| | | | |
|---|---|---|---|
| 5,751,761 A | 5/1998 | Gilhousen | |
| 6,611,494 B1 | 8/2003 | Ovalekar et al. | |
| 6,956,980 B2 * | 10/2005 | Nagata et al. | 385/2 |
| 7,260,076 B1 * | 8/2007 | Kowalewski | 370/335 |
| 7,337,204 B2 * | 2/2008 | Dor et al. | 708/400 |
| 2002/0006156 A1 * | 1/2002 | Belaiche | 375/130 |
| 2003/0210647 A1 * | 11/2003 | Yang et al. | 370/208 |
| 2004/0042386 A1 * | 3/2004 | Uesugi et al. | 370/204 |
| 2005/0237919 A1 * | 10/2005 | Pettendorf et al. | 370/208 |

OTHER PUBLICATIONS

Yang et al., 2D Orthogonal Spreading Codes for Multicarrier DS-CDMA Systems, 2003 IEEE, pp. 3277-3281.

* cited by examiner

*Primary Examiner*—Aung S Moe
*Assistant Examiner*—Vinncelas Louis
(74) *Attorney, Agent, or Firm*—Rabin & Berdo, P.C.

(57) ABSTRACT

An apparatus for generating a 2D spreading code and method for the same are proposed. The apparatus for generating the 2D spreading code includes a column counter, a row counter, a codeword selector, and a logic unit. The logic unit performs logic operations on the output of the column counter, the row counter, and the codeword selector to generate the 2D spreading code of desired order designated by the codeword selector. The 2D spreading code includes 4 2×2 initial matrixes for generating $4^i$ codes for $4^i$ users in the $i^{th}$ order. The apparatus for generating the 2D spreading code according to the present invention is advantageously used in OFDM system to increase the number of subscribers with reduced interference.

14 Claims, 6 Drawing Sheets

APPARATUS FOR GENERATING 2D SPREADING CODE AND METHOD FOR THE SAME

BACKGROUND OF THE INVENTION

1. Field of the Invention

The present invention relates to an apparatus for generating a 2D spreading code and method for the same, especially to an apparatus for generating a 2D spreading code used in OFDM system to increase subscriber number and method for the same.

2. Description of Related Art

The wireless communication system has rapid progress from 1G analog systems and 2G digital systems like GSM, IS-95A to 3G digital systems by the advance of hardware technology and coding technology. The 3G digital systems, such as WCDMA, CDMA2000, can provide high-speed data and voice transmission. The transmission throughput of wireless communication system can be improved by multiple accessing schemes. For example, frequency division multiple access (FDMA) divides the total bandwidth to a plurality of frequency sub-channels for user. Time division multiple access (TDMA) separates users by allocating short and distinct time slots for users. On the contrary, in a code division multiple access (CDMA) scheme, all users transmits at the same time on the same carrier using a wider bandwidth than in a TDMA system. The signals of users are distinguished by assigning different spreading codes with low cross-correlation properties. Advantages of the spread spectrum techniques are immunity against multi-path distortion, simple frequency planning, high flexibility, variable rate transmission, better security and resistance of interference.

Figure 1:
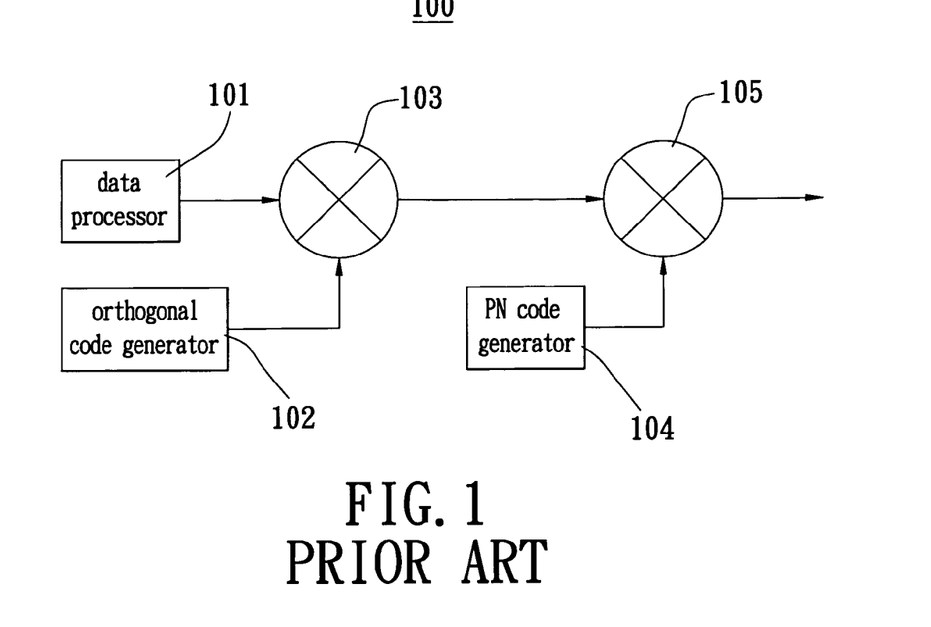
FIG. 1 shows a schematic diagram of a prior art CDMA transmitter.

FIG. 1 shows a schematic diagram of a prior art CDMA transmitter 100, which includes a data processor 101, a PN code generator 102, a first operator 103, an orthogonal code generator 104 and a second operator 105. The data processor 101 outputs a voice data, which is operated, by the first operator 103, with a PN code generated by the PN code generator 102. The PN code is used to indicate a specific base station and provide signal synchronization. The resulting signal is then operated, by the second operator 105, with an orthogonal code generated by the orthogonal code generator 104. The orthogonal code is used to discriminate different users in the same base station.

Figure 2:
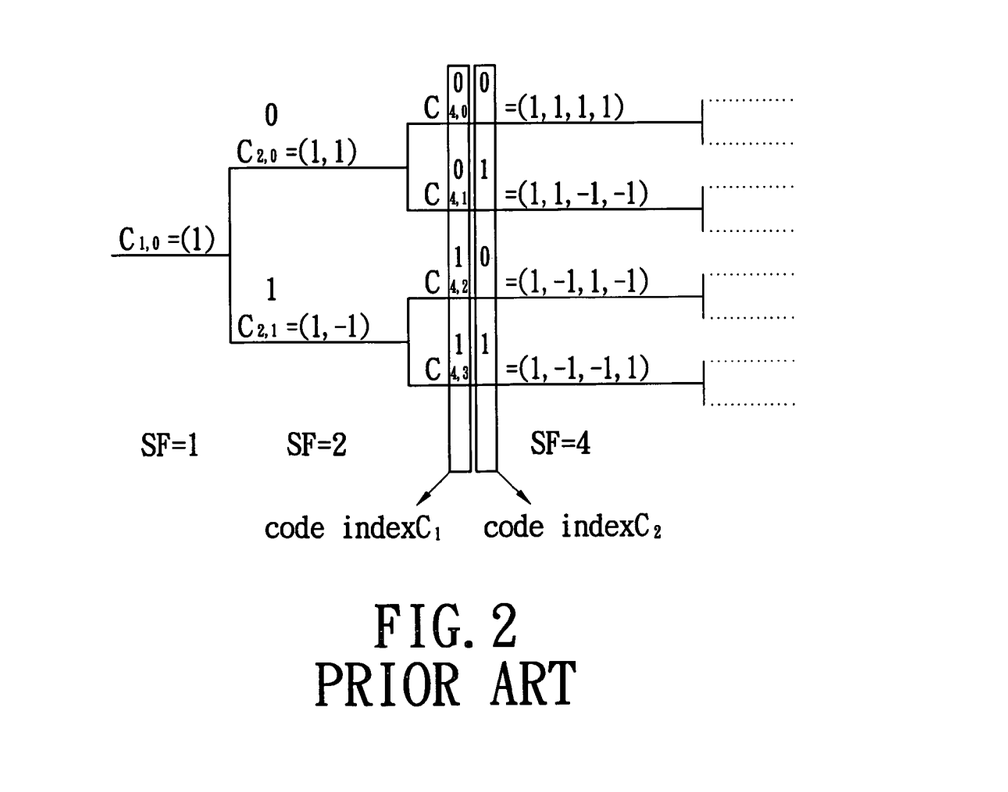
FIG. 2 shows a schematic view of Walsh-Hadamard matrix of different orders.

Taking IS-95CDMA system as an example, it has an orthogonal code generator 104 generating a Walsh-Hadamard code according to following recursion relationship:

$$H_{2n} = \begin{bmatrix} H_n & H_n \\ H_n & \overline{H}_n \end{bmatrix}$$

wherein n is an integer larger than zero and $\overline{H}_n$ is obtained by negating $H_n$. The Walsh-Hadamard cod is selected from one row of the Walsh-Hadamard matrix, which has mutual orthogonal rows. The higher-order Walsh-Hadamard matrix can be obtained by above recursion relationship with lower-order Walsh-Hadamard matrix. FIG. 2 shows a schematic view of Walsh-Hadamard matrix of different orders. In Walsh-Hadamard matrix of i-th order, the spreading factor $SF=2^i$ and the number of codewords in i-th order is $2^i$. More particularly, the number of codeword is 1 in 0-th layer $(SF=2^0=1)$, namely $C_{1,0}=1$. The number of codeword is 2 in 1-st layer $(SF=2^1=2)$, namely $C_{2,0}=(1,1)$ and $C_{2,1}(1,-1)$. The number of codeword is 4 in 2-nd order $(SF=2^2=4)$, namely $C_{4,0}=(1,1,1,1)$, $C_{4,1}=(1,1,-1,-1)$, $C_{4,2}=(1,-1,1,-1)$ and $C_{4,3}=(1,-1,-1,1)$. Below lists example of several Walsh-Hadamard matrix:

$$H_2 = \begin{bmatrix} 1 & 1 \\ 1 & -1 \end{bmatrix}, H_4 = \begin{bmatrix} H_2 & H_2 \\ H_2 & -H_2 \end{bmatrix}, \ldots ,$$

$$H_{2^N} = \begin{bmatrix} H_{2^{N-1}} & H_{2^{N-1}} \\ H_{2^{N-1}} & -H_{2^{N-1}} \end{bmatrix}$$

For example, in IS-95CDMA system, the transmitter thereof generates 64 Walsh-Hadamard codes for users in real time by lookup table or hardware generator such as DSP circuit or ASIC unit.

The wide-band CDMA system generally requires a Walsh-Hadamard with higher order and demands an efficient system for generating larger Walsh-Hadamard matrix. U.S. Pat. No. 5,751,761 discloses an orthogonal variable spreading factor (OVSF) code generator for CDMA system. The OVSF code generator generates codeword of different length for different subscriber amount. The minimum codeword length in 3G systems is 4 and the codeword generated by the OVSF code generator can be adjusted with regard to subscriber amount. The base station with larger subscriber amount can be assigned with OVSF code having fewer codeword such 4.

Figure 3:
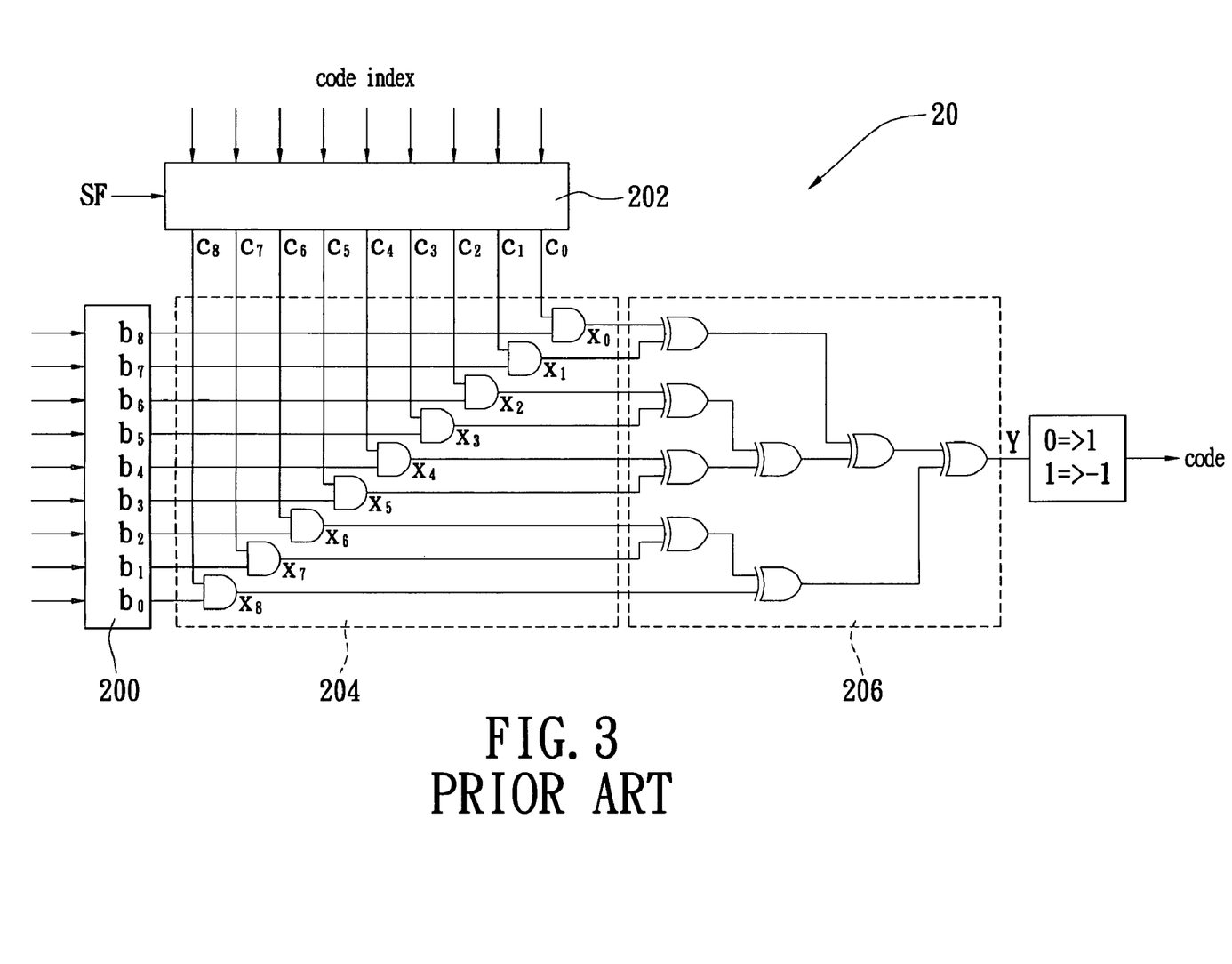
FIG. 3 shows a prior art 1D OVSF code generator.

The OVSF code disclosed in U.S. Pat. No. 5,751,761 is one-dimensional code and generated by a simple scheme. FIG. 3 shows a prior art OVSF code generator 20, which comprises a counter 200, a Walsh function selector 202, a plurality of AND gates 204 and a plurality of OR gates 206. The OVSF code generator 20 is composed of a plurality of shift registers (not shown) and operated at predetermined chip rate such as 1.2288 MHz. For example, the counter 200 may comprise 10 registers for generating 10-bit Walsh-Hadamard code. The Walsh function selector 202 selects a particular Walsh-Hadamard code with reference to spreading factor (SF) and code index. The code index is illustrated in FIG. 2 as $c_1=[0011]$ and $c_2=[0101]$. As shown in this figure, the inputs of the AND gates 204 are connected to corresponding registers and outputs of the Walsh function selector 202 for logic operation. The plurality of OR gates 206 are connected to outputs of the AND gates 204 for generating desired codeword in serial manner.

Figure 4:
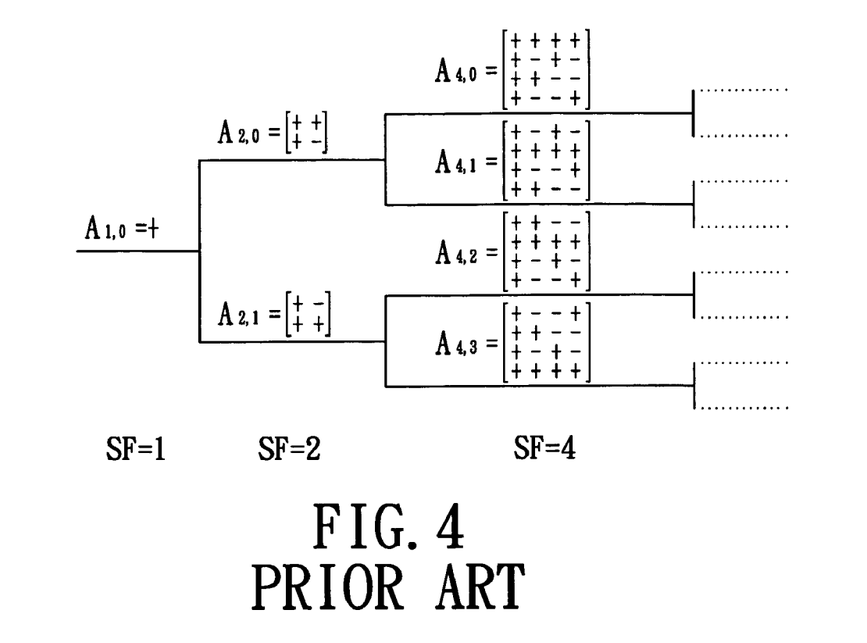
FIG. 4 shows a prior art coding scheme of the 2D OVSF code generator.

U.S. Pat. No. 5,751,761 discloses a one-dimensional (1D) OVSF code generator for CDMA system, which has limited data transmission capability. U.S. pre-grant publication 2003/0210647 discloses a two-dimensional (2D) OVSF code generator for CDMA system, which has better data transmission capability. FIG. 4 shows the coding scheme of the 2D OVSF code generator in publication 2003/0210647, wherein "+" indicates "+1" and "−" indicates "−1". The coding scheme has also multiple orders. In 2D OVSF code of i-th order, the spreading factor $SF=2^i$ and the number of codewords in i-th order is $2^i$. More particularly, the number of codeword is 1 in 0-th layer $(SF=2^0=1)$, namely $A_{1,0}=1$. The number of codeword is 2 in 1-st layer $(SF=2^1=2)$, namely $$A_{2,0} = \begin{bmatrix} + & + \\ + & - \end{bmatrix} \text{ and } A_{2,1} = \begin{bmatrix} + & - \\ + & + \end{bmatrix}.$$

The number of codeword is 4 in 2-nd layer (SF=$2^2$=4), and has codes in upper branch and lower branch. The codes in upper branch are derived by $$A_{2,0} = \begin{bmatrix} + & + \\ + & - \end{bmatrix},$$

namely $$A_{4,0} = \begin{bmatrix} A_{2,0} & A_{2,0} \\ A_{2,0} & -A_{2,0} \end{bmatrix} = \begin{bmatrix} + & + & + & + \\ + & - & + & - \\ + & + & - & - \\ + & - & - & + \end{bmatrix} \text{ and}$$

$$A_{4,1} = \begin{bmatrix} A_{2,1} & A_{2,1} \\ A_{2,1} & -A_{2,1} \end{bmatrix} = \begin{bmatrix} + & - & + & - \\ + & + & + & + \\ + & - & - & + \\ + & + & - & - \end{bmatrix}.$$

The lower branch are derived by $$A_{2,1} = \begin{bmatrix} + & - \\ + & + \end{bmatrix},$$

namely $$A_{4,2} = \begin{bmatrix} A_{2,0} & -A_{2,0} \\ A_{2,0} & A_{2,0} \end{bmatrix} = \begin{bmatrix} + & + & - & - \\ + & - & - & + \\ + & + & + & + \\ + & - & + & - \end{bmatrix} \text{ and}$$

$$A_{4,3} = \begin{bmatrix} A_{2,1} & -A_{2,1} \\ A_{2,1} & A_{2,1} \end{bmatrix} = \begin{bmatrix} + & - & - & + \\ + & + & - & - \\ + & - & + & - \\ + & + & + & + \end{bmatrix}.$$

More particularly, all Walsh-Hadamard codes disclosed in publication 2003/0210647 are derived based on either $$A_{2,0} = \begin{bmatrix} + & + \\ + & - \end{bmatrix}$$

for upper branch or $$A_{2,1} = \begin{bmatrix} + & - \\ + & + \end{bmatrix}$$

for lower branch.

The Walsh-Hadamard codes are also limited to $2^i$ in i-th order for $2^i$ users to preserve orthogonal property.

SUMMARY OF THE INVENTION

It is an object of the subject application to provide an apparatus for generating a 2D spreading code, which has flexible code length in two of spectral domain, temporal domain and spatial domain in response to channel characteristics. Therefore, maximal diversity gain can be achieved for spectral domain, temporal domain or spatial domain.

It is another object of the subject application to provide an apparatus for generating a 2D spreading code, which is advantageously used in OFDM system.

To achieve above objects, the present invention provides a method for generating a 2D spreading code for using in a communication signal. The method comprises steps of: (a) reading a spreading factor and a code index; (b) generating four initial 2×2 matrixes, each of the matrixes containing three +1 element and one −1 element, wherein four initial matrixes have different position to each other; (c) performing Kronecker multiplication operation among the four initial matrixes according to the spreading factor and a code index, and generating a 2D spreading code with desired order. More particularly, the four initial 2×2 matrixes are $$D_{4,0} = \begin{bmatrix} + & + \\ + & - \end{bmatrix}, D_{4,1} = \begin{bmatrix} + & - \\ + & + \end{bmatrix}, D_{4,2} = \begin{bmatrix} + & + \\ - & + \end{bmatrix} \text{ and}$$

$$D_{4,3} = \begin{bmatrix} - & + \\ + & + \end{bmatrix},$$

and + indicates +1 and − indicates −1. The 2D spreading codes have following generic formula:

$$D_{4^{i+1},k} = D_{4,m} \otimes D_{4^i,n}$$

wherein i indicates order number and can be 1, 2 . . . etc. $\otimes$ is Kronecker matrix multiplication operation $$0 \leq m \leq 3, 0 \leq n \leq 4^i - 1,$$

$$0 \leq k \leq 4^{i+1} - 1,$$

To achieve above objects, the present invention provides an apparatus for generating a 2D spreading code for using in a communication signal. The apparatus comprises a first counter; a second counter; a code selector for receiving a spreading factor and a code index; a first logic unit processing a result of logic operation on the first counter and the code selector and processing a result of logic operation on the second counter and the code selector to generate the 2D spreading code. Moreover, the apparatus for generating a 2D spreading code further comprises a path switch; a second logic unit connected to the first counter through the path switch; and an output selector. The path switch is operated to perform a logic operation on output of the second counter and output of the code selector by the second logic unit and to generate a 1D orthogonal variable spreading factor (OVSF) code. The output selector selects an output code between the 2D spreading code and the 1D orthogonal variable spreading factor (OVSF) code.

The above summaries are intended to illustrate exemplary embodiments of the invention, which will be best understood in conjunction with the detailed description to follow, and are not intended to limit the scope of the appended claims.

DETAILED DESCRIPTION OF PREFERRED EMBODIMENTS

The present invention is intended to provide an apparatus for generating a 2D spreading code and method for the same. The apparatus and method according to the present invention provides 2D spreading code (two degree of freedom selected from spectral domain, temporal domain and spatial domain) and have forward compatibility with the 1D spreading code in 3G system.

Figure 5:
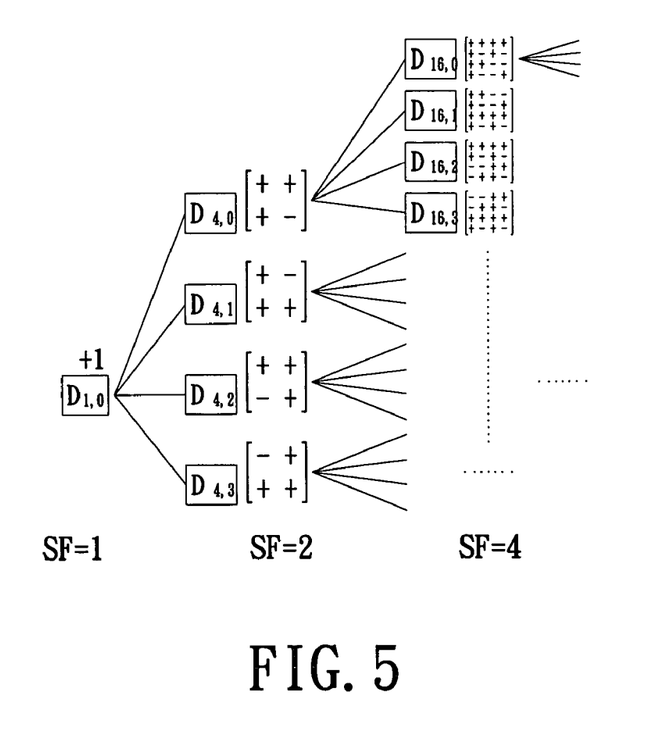
FIG. 5 shows the coding scheme for 2D spreading code according to the present invention.

FIG. 5 shows the coding scheme for 2D spreading code according to the present invention. The coding scheme has also multiple orders. In 2D OVSF code of i-th order, the spreading factor is $4^i$ and the number of codewords in i-th order is $2^i$. More particularly, the number of codeword is 1 in 0-th layer (SF=$4^0$=1), namely $D_{1,0}$=1. The number of codewords is 4 in 1-st layer (SF=$4^1$=4), namely $$D_{4,0} = \begin{bmatrix} + & + \\ + & - \end{bmatrix}, D_{4,1} = \begin{bmatrix} + & - \\ + & + \end{bmatrix},$$

$$D_{4,2} = \begin{bmatrix} + & + \\ - & + \end{bmatrix} \text{ and } D_{4,3} = \begin{bmatrix} - & + \\ + & + \end{bmatrix}.$$

The number of codewords is 16 in 2-nd layer (SF=$4^2$=16). Different to prior art 2D spreading code generating scheme, there are four braches originated from each of the codeword in 1-st layer for successive 2-nd layer. Taking the branches originated from $$D_{4,0} = \begin{bmatrix} + & + \\ + & - \end{bmatrix}$$

as example, the four resulting codewords are $$D_{16,0} = \begin{bmatrix} D_{4,0} & D_{4,0} \\ D_{4,0} & -D_{4,0} \end{bmatrix}, D_{16,1} = \begin{bmatrix} D_{4,0} & -D_{4,0} \\ D_{4,0} & D_{4,0} \end{bmatrix},$$

$$D_{16,2} = \begin{bmatrix} D_{4,0} & D_{4,0} \\ -D_{4,0} & D_{4,0} \end{bmatrix} \text{ and } D_{16,3} = \begin{bmatrix} -D_{4,0} & D_{4,0} \\ D_{4,0} & D_{4,0} \end{bmatrix}.$$

The remaining three groups of branches can be derived in similar way. More particularly, the 2D spreading code of the present invention are originated from four initial matrixes, namely, $D_{4,0}, D_{4,1}, D_{4,2},$ and $D_{4,3}$ in first layer. The 2D spreading codes in the second layer are separated into four groups. The first group of 2D spreading codes are obtained by performing Kronecker matrix operation for $D_{4,0}$ with $D_{4,0}, D_{4,1},$ $D_{4,2},$ and $D_{4,3}$, respectively. The second group of 2D spreading codes are obtained by performing Kronecker matrix operation for $D_{4,1}$ with $D_{4,0}, D_{4,1}, D_{4,2},$ and $D_{4,3}$, respectively. The third group of 2D spreading codes are obtained by performing Kronecker matrix operation for $D_{4,2}$ with $D_{4,0}, D_{4,1},$ $D_{4,2},$ and $D_{4,3}$, respectively. The fourth group of 2D spreading codes are obtained by performing Kronecker matrix operation for $D_{4,3}$ with $D_{4,0}, D_{4,1}, D_{4,2},$ and $D_{4,3}$, respectively. The 2D spreading code in successive order can be derived in similar way. It should be noted the subscript of codeword in above description could be subjected to permutation without departing from scope of the present invention. The above description is one preferred embodiment of the present invention.

Figure 6:
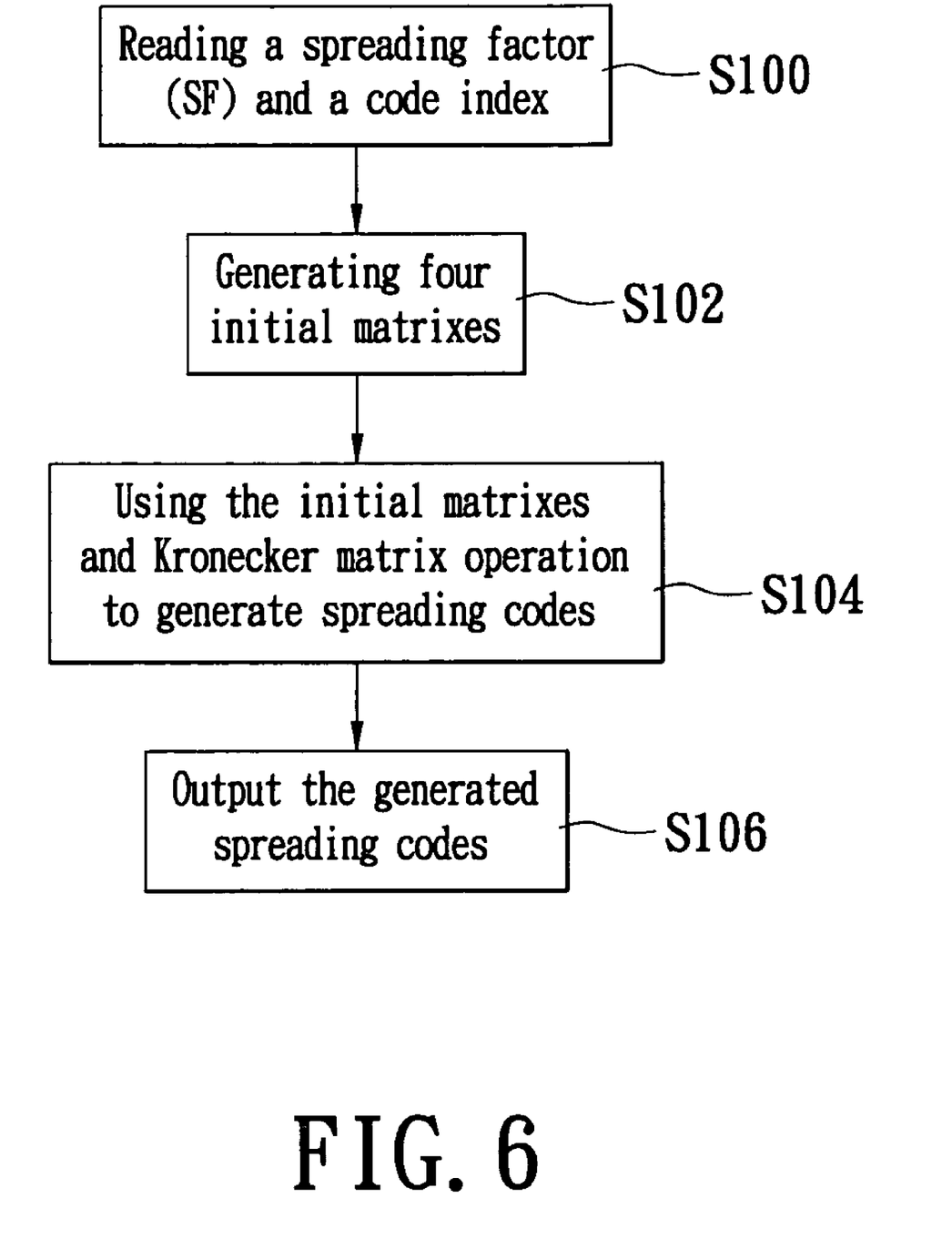
FIG. 6 shows a flowchart of the 2D spreading code generating method of the present invention.

FIG. 6 shows a flowchart of the 2D spreading code generating method of the present invention.

S100: Reading a spreading factor (SF) and a code index.

S102: Generating four initial matrixes, namely, the four matrix $D_{4,0}, D_{4,1}, D_{4,2},$ and $D_{4,3}$ in the first order.

S104: Using the initial matrixes and Kronecker matrix operation to generate spreading codes of desired order according to the spreading factor (SF) and the code index.

S106: Output the generated spreading codes of desired order.

The spreading codes generated by flowchart of FIG. 6 has the following generic expression:

$$D_{4^{i+1},k} = D_{4,m} \otimes D_{4^i,n}$$

wherein i indicates order number and can be 1, 2 . . . etc.

$\otimes$ is Kronecker matrix multiplication operation $0 \leq m \leq 3, 0 \leq n \leq 4^i - 1,;$ $0 \leq k \leq 4^{i+1} - 1,$ wherein $D_{4^{i+1},k}$ permits permutation.

Figure 7:
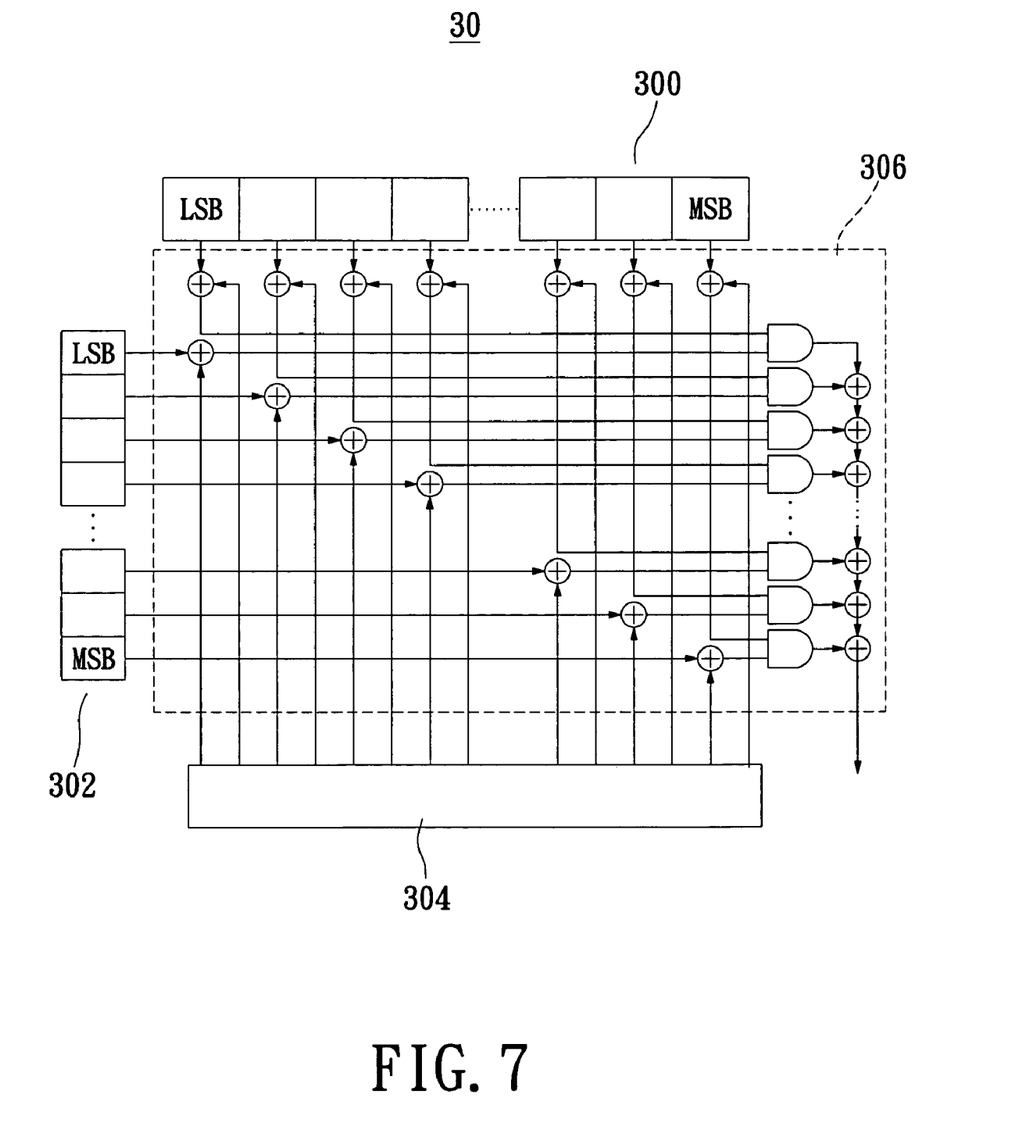
FIG. 7 shows a schematic view of the generating apparatus of 2D spreading code according to a preferred embodiment of the present invention.

Reference is now made to FIG. 7, which shows a schematic view of the generating apparatus 30 of 2D spreading code according to a preferred embodiment of the present invention. The generating apparatus 30 of 2D spreading code comprises a column counter 300, a row counter 302, a code selector 304 and a logic unit 306. The logic unit 306 comprises a plurality of AND gates (no label) and a plurality of XOR gates (no label). One output of the code selector 304 and one output of the column counter 300 are subjected to exclusive OR operation by one XOR gate and the result is sent to one input of corresponding AND gate. One output of the code selector 304 and one output of the row counter 302 are subjected to exclusive OR operation by one XOR gate and the result is sent to another input of corresponding AND gate. The output of the AND gates are subjected to exclusive OR operation for generating code word in serial manner. More particularly, code indexes 00, 10, 01, 11 corresponding to the $D_{4,0}, D_{4,1}, D_{4,2},$ and $D_{4,3}$, respectively, are sent to the column counter 300 and the row counter 302, and a selection codeword is sent to the code selector 304. In case of generating the spreading code $D_{16,0}$ shown in FIG. 5, a codeword 0000 is sent to the code selector 304 to manifest the operation of the matrix $D_{4,0}$ and $D_{4,0}$. In case of generating the spreading code $D_{16,1}$ shown in FIG. 5, a codeword 0010 is sent to the code selector 304 to manifest the operation of the matrix $D_{4,0}$ and $D_{4,1}$. The generation of other spreading codes can be derived in similar way. It should be noted that the bit number of the code selector 304 could be adjusted to meet practical requirement.

In comparison with the 2D spreading code technique proposed by the US pre-grant publication 2003/0210647, the 2D spreading cod generating apparatus of the present invention can provide more spreading codes for subscribers. More particular, in i-order of spreading code, the 2D spreading code technique in the US pre-grant publication 2003/0210647 supports only $2^i$ subscribers, while the 2D spreading cod generating apparatus of the present invention can support $4^i$ subscribers. In the present invention, the subscriber number is increased at the expense of auto-correlation property of spreading code per se and the cross correlation property between spreading codes. However, the auto-correlation property and the cross correlation property of spreading codes are not important in OFDM system. Therefore, the 2D spreading cod generating apparatus of the present invention can be advantageously applied to OFDM system.

Figure 8:
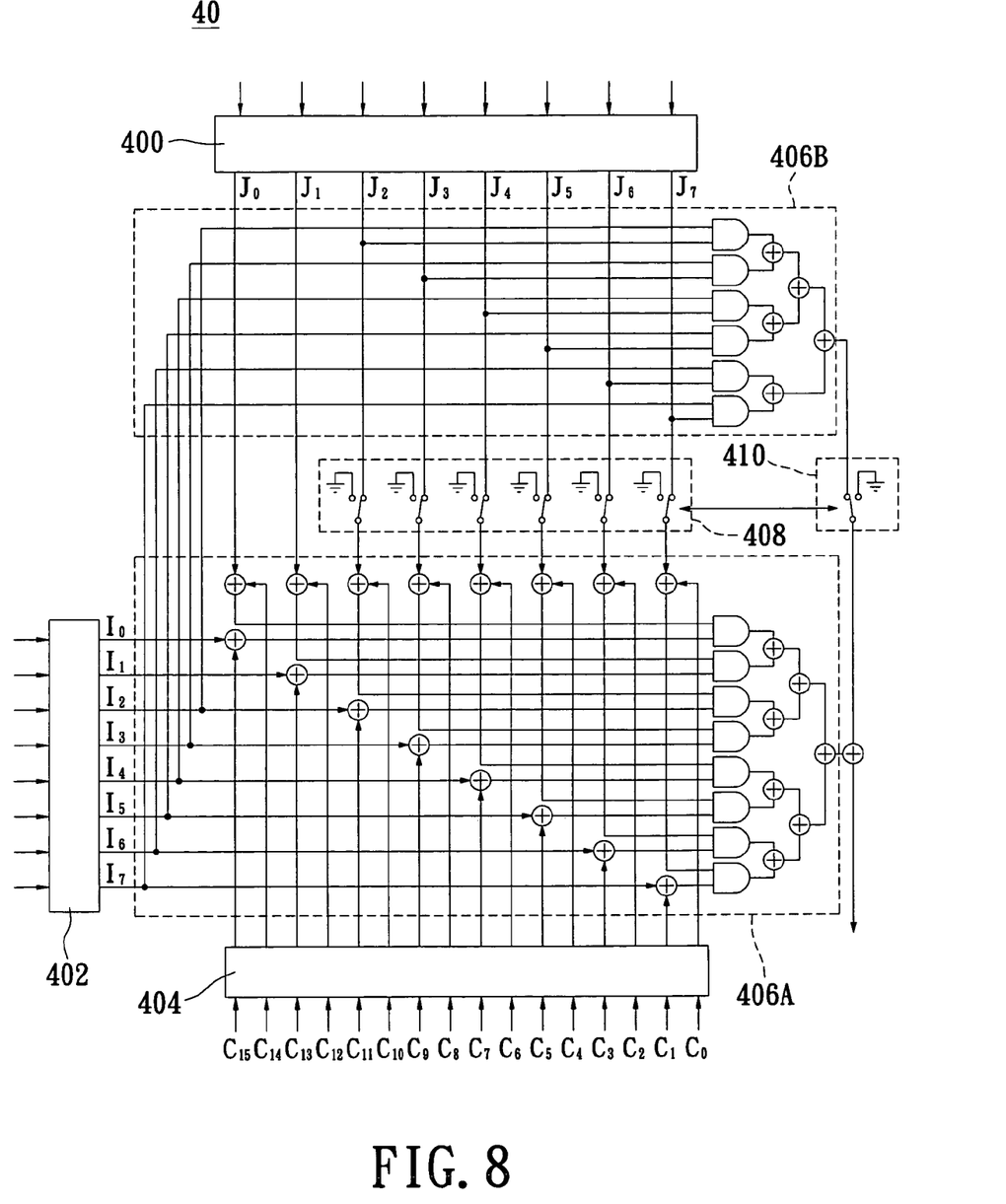
FIG. 8 shows a schematic view of the spreading code generating apparatus according to another preferred embodiment of the present invention.

Reference is now made to FIG. 8, which shows a schematic view of the spreading code generating apparatus 40 according to another preferred embodiment of the present invention. In this embodiment, the generating apparatus 40 can be operated to selectively output 2D spreading code or 1D OVSF code for forward compatibility. The generating apparatus 40 comprises a column counter 400, a row counter 402, a code selector 404 composed of a plurality of shift registers, a first logic unit 406A comprises a plurality of logic gates, a second logic unit 406B comprises a plurality of logic gates, a path switch 408 and an output selector 410. The first logic unit 406A comprises a plurality of AND gates (no label) and a plurality of XOR gates (no label). The second logic unit 406B also comprises a plurality of AND gates (no label) and a plurality of XOR gates (no label).

To generate 2D spreading code, the path switch 408 is operated to connect part of the output from the column counter 400 to corresponding XOR gates in the first logic unit 406A. Therefore, the output of column counter 400 and the output of the code selector 404 are subjected to exclusive OR operation, and the result are sent to one input of corresponding AND gate of the first logic unit 406A. The output of row counter 402 and the output of the code selector 404 are subjected to exclusive OR operation, and the result are sent to another input of corresponding AND gate of the first logic unit 406A. The output of the AND gates are subjected to exclusive OR operation for generating spreading code in serial manner. The codes are then selected by the output selector 410.

To generate 1D OVSF code, the path switch 408 is operated to separate partial output of the column counter 400 from corresponding XOR gates in the first logic unit 406A. At this time, the output of the column counter 400 and the output of the code selector 404 are processed by the second logic unit 406B to generate corresponding 1D OVSF code. The 1D OVSF code is then output by the output selector 410.

To sum up, the apparatus and method for generating a 2D spreading code according to the present invention have following advantages:

1. Enhanced channel efficiency for more subscribers.
2. Simple logic implementation for ODFM system.
3. Forward compatibility.

Although the present invention has been described with reference to the preferred embodiment thereof, it will be understood that the invention is not limited to the details thereof. Various substitutions and modifications have suggested in the foregoing description, and other will occur to those of ordinary skill in the art. For example, the first logic unit 406A and the second logic unit 406B can be implemented by other logic gates than AND gates and XOR gates; the initial matrixes can be generated either by look-up table or by a processor. Therefore, all such substitutions and modifications are intended to be embraced within the scope of the invention as defined in the appended claims.

What is claimed is:

1. A method for generating a 2D spreading code in a communication transmitter, comprising steps of:

reading a spreading factor and a code index;

generating, in a communication transmitter, four initial 2×2 matrixes, each of the matrixes containing three +1 elements and one −1 element, wherein the four initial matrixes have different positions to each other and correspond to a same level in a tree as each other;

performing Kronecker multiplication operation among the four initial matrixes according to the spreading factor and a code index, and generating a 2D spreading code with desired order;

wherein the 2D spreading codes have a following generic formula:

$$D4,+,.k = D4,. \otimes D4, \ldots$$

wherein i indicates order number and can be 1, 2 ... etc. $\otimes$ is a Kronecker matrix multiplication operation $$0 <= m <= 3, \ 0 <= n <= 4^i - 1,$$

$$0 <= k <= 4^{(i+1)} - 1.$$

2. The method for generating a 2D spreading code as in claim 1, wherein the four initial 2×2 matrixes are $$D_{4,0} = \begin{bmatrix} + & + \\ + & - \end{bmatrix}, \ D_{4,1} = \begin{bmatrix} + & - \\ + & + \end{bmatrix},$$

$$D_{4,2} = \begin{bmatrix} + & + \\ - & + \end{bmatrix} \text{ and } D_{4,3} = \begin{bmatrix} - & + \\ + & + \end{bmatrix},$$

and + indicates +1 and − indicates −1.

3. The method for generating a 2D spreading code as in claim 1, wherein the $D_{4^{i+1},k}$ permits permutation.

4. The method for generating a 2D spreading code as in claim 1, wherein the communication signal is an OFDM signal.

5. The method for generating a 2D spreading code as in claim 1, wherein the four initial 2×2 matrixes are generated by look-up table.

6. The method for generating a 2D spreading code as in claim 1, wherein the four initial 2×2 matrixes are generated by a processor in real time.

7. An apparatus for generating a 2D spreading code for using in a communication signal, comprising:

a first counter;

a second counter distinct from the first counter;

a code selector for receiving a spreading factor and a code index;

a first logic unit processing a result of a first logic operation on the first counter and the code selector and processing a result of a second logic operation on the second counter and the code selector to generate the 2D spreading code;

wherein, the 2D spreading codes have a following generic formula:

$$D_{4^{i+1},k} = D_{4,m} \otimes D_{4^i,n}$$

wherein i indicates order number and can be 1, 2 ... etc. $\otimes$ is Kronecker matrix multiplication operation $$m \in \{0,1,2,3\}, \ n \in \{0,1,\Lambda,4^i-1\}, \ k = 4*n + m.$$

8. The apparatus for generating a 2D spreading code as in claim 7, wherein the first counter is a column counter and the second counter is a row counter.

9. The apparatus for generating a 2D spreading code as in claim 7, wherein the first logic unit is composed of a plurality of AND gates and XOR gates.

10. The apparatus for generating a 2D spreading code as in claim 7, wherein the first logic unit generates four initial 2×2 matrixes:

$$D_{4,0} = \begin{bmatrix} + & + \\ + & - \end{bmatrix}, D_{4,1} = \begin{bmatrix} + & - \\ + & + \end{bmatrix},$$

$$D_{4,2} = \begin{bmatrix} + & + \\ - & + \end{bmatrix} \text{ and } D_{4,3} = \begin{bmatrix} - & + \\ + & + \end{bmatrix},$$

wherein + indicates +1 and − indicates −1.

11. The apparatus for generating a 2D spreading code as in claim 7, wherein the $D_{4^{i+1},k}$ permits permutation.

12. The apparatus for generating a 2D spreading code as in claim 7, wherein the communication signal is an OFDM signal.

13. The apparatus for generating a 2D spreading code as in claim 7, further comprising:
a path switch;
a second logic unit connected to the first counter through the path switch;
wherein the path switch is operated to perform a logic operation on output of the second counter and output of the code selector by the second logic unit and to generate a 1D orthogonal variable spreading factor (OVSF) code.

14. The apparatus for generating a 2D spreading code as in claim 13, further comprising
an output selector for selecting an output code between the 2D spreading code and the 1D orthogonal variable spreading factor (OVSF) code.

* * * * *

UNITED STATES PATENT AND TRADEMARK OFFICE
CERTIFICATE OF CORRECTION

PATENT NO. : 7,586,835 B2 Page 1 of 1
APPLICATION NO. : 10/995466
DATED : September 8, 2009
INVENTOR(S) : Lee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1299 days.

Signed and Sealed this

Twenty-first Day of September, 2010

David J. Kappos
*Director of the United States Patent and Trademark Office*